United States Patent Office 2,992,454
Patented July 18, 1961

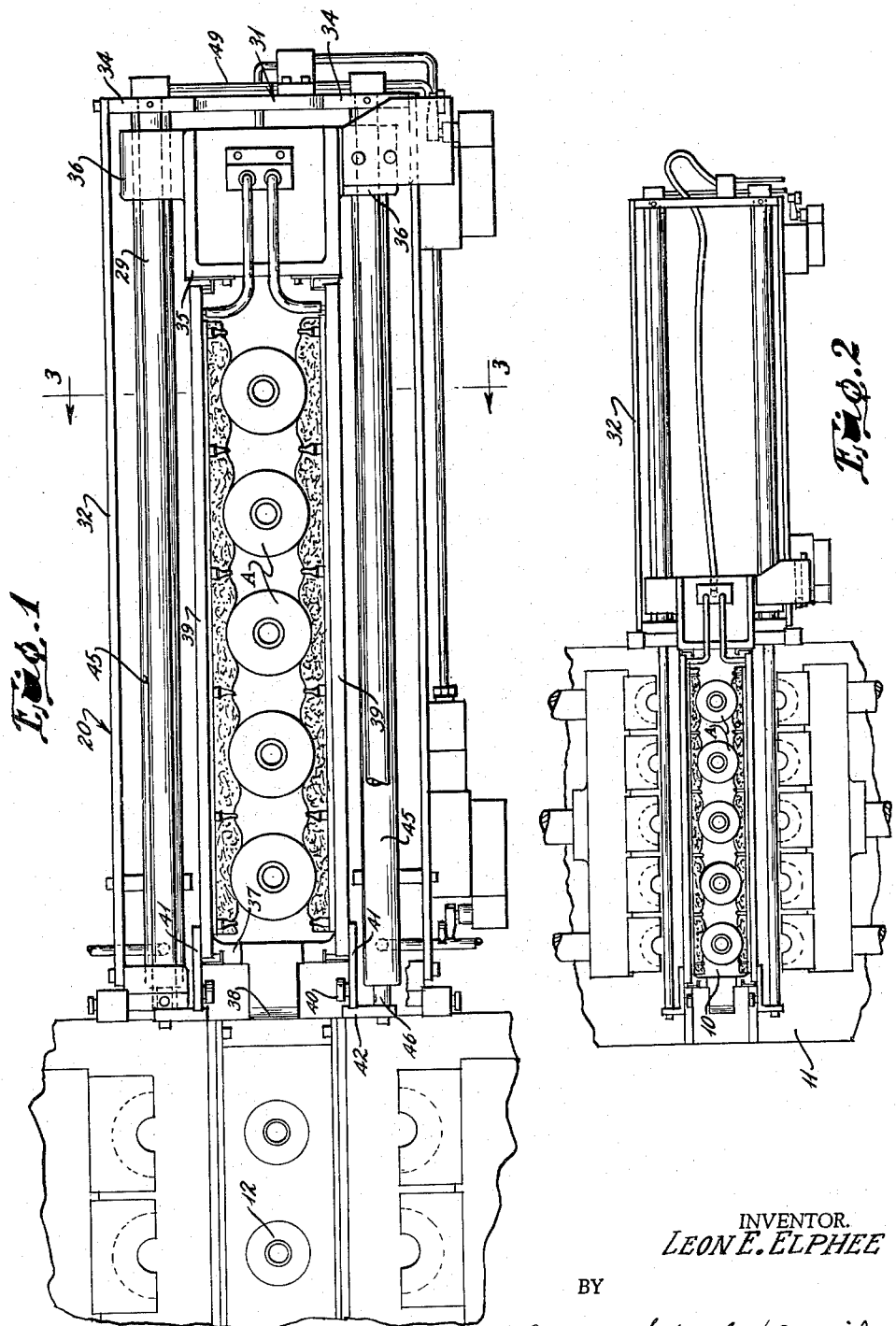
July 18, 1961 L. E. ELPHEE 2,992,454
METHOD AND APPARATUS FOR REMOVING BLOWN PLASTIC CONTAINERS
Filed March 30, 1959 4 Sheets-Sheet 1
INVENTOR.
LEON E. ELPHEE
BY
ATTORNEYS

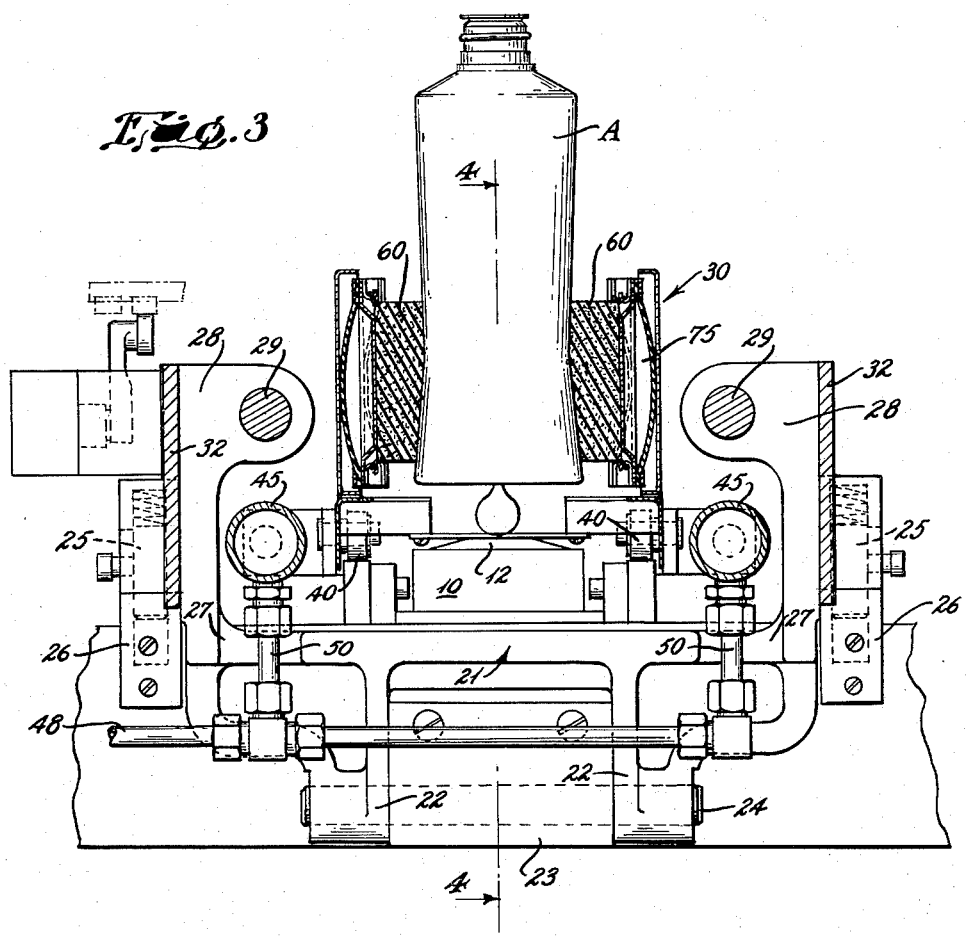

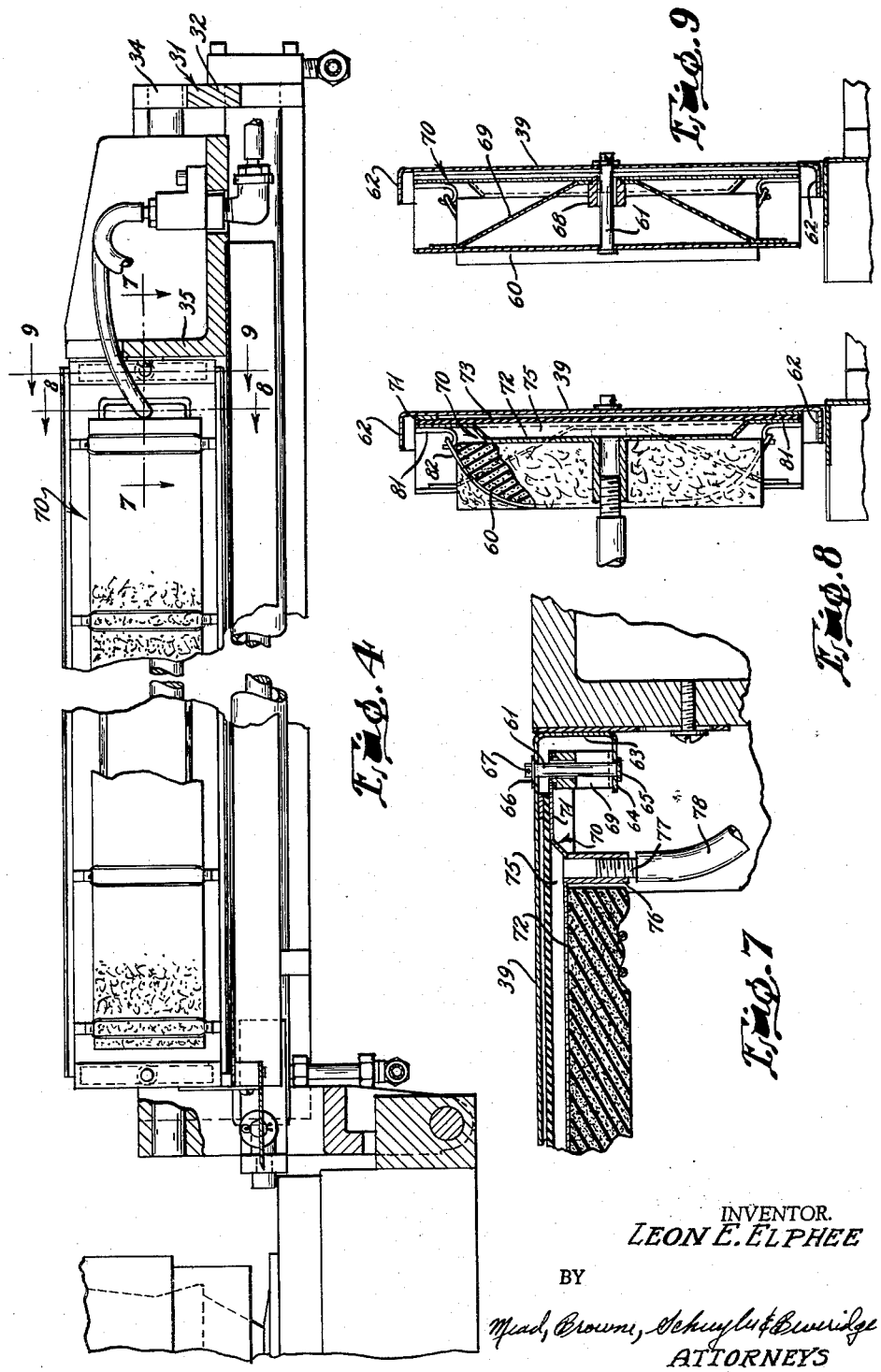

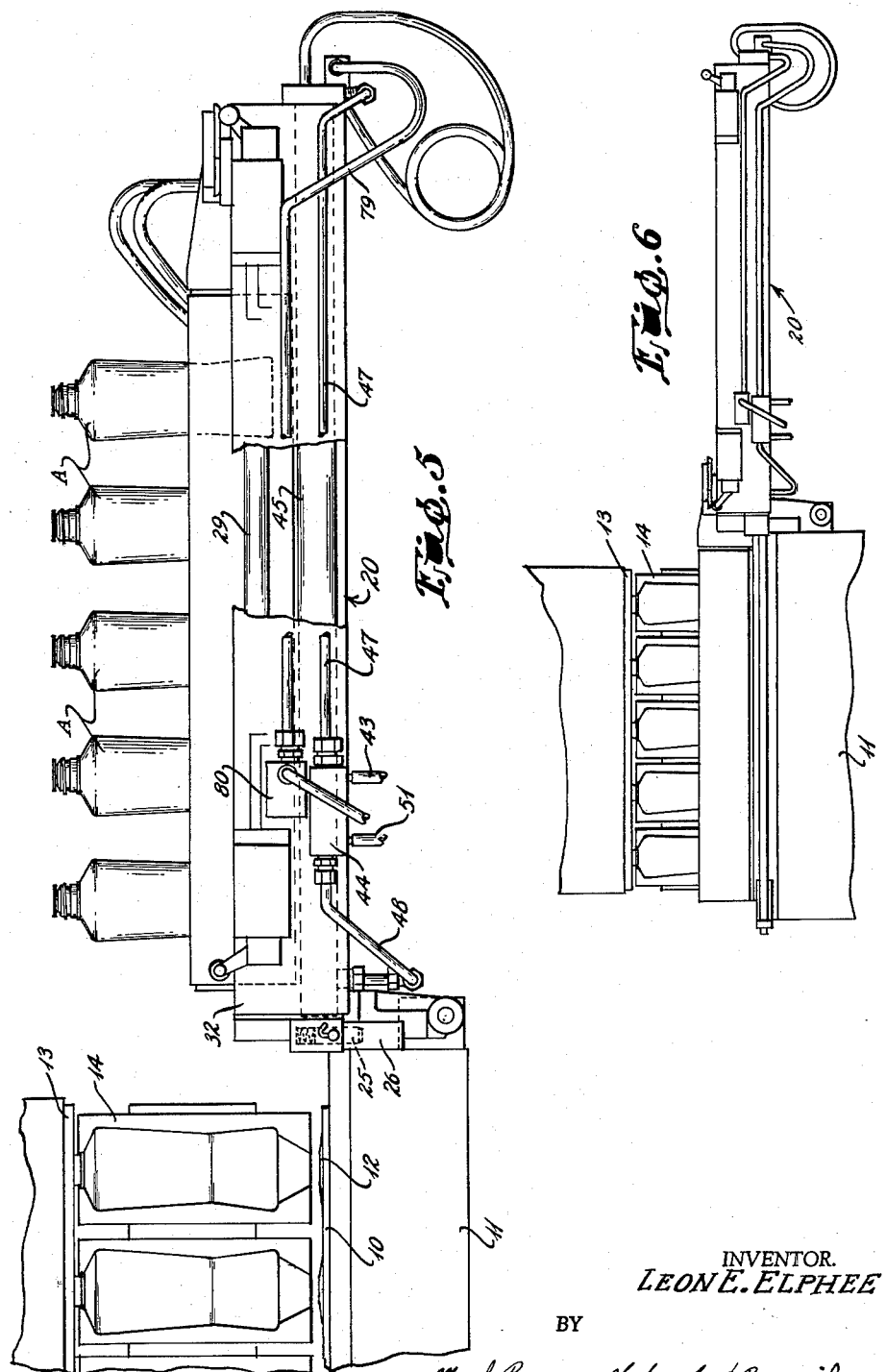

2,992,454
METHOD AND APPARATUS FOR REMOVING BLOWN PLASTIC CONTAINERS
Leon E. Elphee, Toledo, Ohio, assignor to Owens-Illinois Glass Company, a corporation of Ohio
Filed Mar. 30, 1959, Ser. No. 803,026
6 Claims. (Cl. 18—5)

The present invention relates to a take-out method and mechanism, and more particularly to a gripping and removing device and method for the removal of formed articles from a forming machine.

In the manufacture of articles, such as organic plastic containers or the like, in a forming machine, such as a blow molding machine, it is essential to economic operation that the formed articles be removed as quickly as possible and as soon as possible after molding. Because of the residual heat content of the article and to facilitate the simultaneous removal of a plurality of simultaneously formed articles, automatically operable take out mechanisms are necessary and such mechanisms must handle the easily distortable, still hot articles gently.

The present invention provides a novel take-out mechanism which is particularly useful for the removal of plastic containers from a combined injection molding, extruding and blowing machine of the type fully described in the co-pending application of R. C. Allen and L. E. Elphee, Serial No. 797,276, filed March 4, 1959 and assigned to the assignee of the present invention.

Basically, the forming machine results in the formation of a plurality of aligned vertically elongated articles retained at their tops within finish molds and retained at their bottoms by "tails" or waste material joined to plasticized material remaining in an extrusion orifice. The articles, thus retained top and bottom but free peripherally, must be severed at their lower extremities, engaged by a take-out device, released at their upper extremities, and extracted from the forming zone.

The take-out device of the present invention comprises generally a reciprocable carriage which is displaceable longitudinally to position vertically extending side supports alongside the containers as they are aligned in their blown position. Next, the articles are engaged by resiliently distortable pads carried by the side supports and urged against the articles by fluid pressure inflated fluid pressure envelopes interposed between the pads and the rigid take-out side supports. Once the articles are engaged, the neck molds are released, the take-out is retracted carrying the articles with it to a dumping station clear of the forming apparatus, the inflated envelopes are deflated and articles are dumped.

The utilization of the inflatable envelopes insures the gentle handling of the formed containers and also accommodates the adaption of a given take-out device to the handling of widely variant numbers and sizes of articles. The absence of heretofore required precisely registering clamping or retaining means, the elimination of complicated linkages and other actuating mechanisms, and the utilization of a simple unitary engaging mechanism for a plurality of articles results in heretofore unattainable economies, as well as in rapid operation.

It is, therefore, an important object of the present invention to provide a new and novel method for removing formed articles from a forming machine.

Another important object of this invention resides in the provision of an improved take for removing formed articles from a forming machine wherein an inflatable envelope is utilized to displace article-engaging means into engagement with the article.

An additional important object of this invention is to provide a take-out wherein article-contacting resilient pads are positioned on opposing sides of a plurality of articles and are moved into simultaneous engagement with all of the articles.

It is still another object of this invention to provide an improved take-out mechanism wherein a plurality of aligned articles are straddled by elongated supports parallel to the plane of alignment of the articles, an elongated inflatable envelope is inflated under fluid pressure to urge correspondingly shaped resilient pads into conforming and gripping engagement with the articles, and the take-out supports are retracted to remove the articles therewith.

Other objects and advantages of the invention will appear from the following detailed description taken in conjunction with the annexed drawings, in which:

FIGURE 1 is a plan view of a forming machine provided with a take-out device of the present invention, the take-out being illustrated in its retracted position at which a plurality of articles have been removed from the forming machine;

FIGURE 2 is a view similar to FIGURE 1, but on a reduced scale, further illustrating the machine and the take-out and illustrating the take-out in its extended position;

FIGURE 3 is a vertical sectional view taken along the plane 3—3 of FIGURE 1;

FIGURE 4 is a sectional view taken along the plane 4—4 of FIGURE 3, the articles being removed for clarity of illustration;

FIGURE 5 is an enlarged elevational side view illustrating the take-out in its position in FIGURE 1;

FIGURE 6 is a view similar to FIGURE 5 but on a smaller scale illustrating the take-out in its extended position;

FIGURE 7 is an enlarged fragmentary sectional view taken along the plane 7—7 of FIGURE 4;

FIGURE 8 is an enlarged fragmentary sectional view taken along the plane 8—8 of FIGURE 4; and FIGURE 9 is an enlarged fragmentary sectional view taken along the plane 9—9 of FIGURE 4.

As shown on the drawings: FIGURES 1 and 2 illustrate in plan and FIGURES 5 and 6 illustrate in elevation a portion of an article forming machine of the type described in detail in the above-identified Allen and Elphee application.

In such machines, an orifice plate 10 is superimposed on a supporting block 11 to provide an aligned series of annular orifices 12. Superimposed over the orifice block 10 are a series of neck molds 13 movable vertically into and out of contact with the orifice block. When the neck mold block 13 is elevated to its position illustrated in FIGURES 5 and 6, blow molds 14 are closed on an exposed extruded tubular plastic formation to accommodate the blowing of articles therein. Upon opening of the blow molds 14 (FIGURES 1 and 2), the articles are exposed and are retained at their upper extremities by the neck molds 13 and at their lower extremities by their communication with plasticized material remaining in the orifices 12 (FIGURE 6). It is now necessary to remove the articles from their aligned vertical positions.

The removal of the articles is accomplished by means of a take-out indicated generally at 20 and comprising a fixed slide assembly including a front bracket 21 (FIGURE 3) having depending ears 22 transversely spaced on either side of a pintle 23 carried by the machine base 11 to receive therethrough a pivot pin 24. A pair of spring urged latches 25 engaged in sockets 26 carried by the machine base complete the attachment of the bracket 21 to the machine base 11. Upon release of the latches 25, the complete take-out device 20 can be swung vertically downwardly to a storage position.

The bracket 21 projects laterally outwardly, as at 27, to provide integral, inwardly projecting laterally spaced ears 28 upon which are mounted longitudinally extending guide rods 29 journalling a longitudinally reciprocable carriage indicated generally at 30 for movement in the plane of alignment of the orifices 12.

The rear ends of the rods 29 are supported by a rear bracket 31 having upstanding portion 33 providing laterally spaced ears 34 aligned with the ears 28 to support the rods 29 therebetween in horizontal, parallel relation. The slide assembly is rigidified by a pair of upstanding side walls 32 joining the brackets 21 and 31 and positioned outside the rods 29.

More particularly, the carriage 30 comprises a rear U-shaped bracket 35 carrying laterally projecting guide ears 36 surrounding the guide rods 29, respectively, for sliding movement therealong. The rear bracket 35 is joined to a forward bracket 37 carrying a forwardly directed cutting blade 38 by means of transversely spaced, parallel, longitudinally extending side plates 39. These side plates 39 are spaced transversely through a distance greater than the transverse dimension of any articles to be picked up and removed by the take-out device, the side plates being adapted to straddle the articles A as they are retained by the neck molds 13 and the orifices 12 as best shown in FIGURE 2.

The leading end of the carriage 30 is supported by a pair of rollers 40 journalled on extension arms 41 secured to and carried by the side plates and engageable with the machine frame 11.

The carriage 30 is adapted to be actuated by a pair of actuating cylinders 45 substantially coextensive with and parallel to the carriage 30, the actuating rods 46 of the cylinders 45 each being secured to the leading end of the carriage, as through mounting brackets 42 carried by the roller brackets 41. The cylinders 40 are double acting and are preferably pneumatically actuated as from an air supply line 43 communicating through a solenoid actuated air supply valve 44 operative to alternately connect air in the supply line 43 with an extension conduit 47 and a retraction conduit 48 (FIGURE 5). The extension conduit 47 communicates with the rear ends of the cylinders 45 as through branch lines 49 while the retraction conduit 48 communicates with the forward ends of the cylinders as through branch lines 50 (FIGURE 3).

When the conduit 47 is connected to the air supply line 43, the conduit 48 is connected through exhaust line 51 with the atmosphere. Similarly, line 47 is connected to the exhaust line 51 through the valve 44 when the line 48 is connected to the supply line 43.

The carriage 30 is provided with article-engaging means carried by the side plates 39 and substantially co-extensive therewith. As best seen in FIGURES 3, 8 and 9 of the drawings, the article engaging means preferably comprise inherently resilient pads 60 formed of suitable material, such as a foamed polyurethane resin, sponge rubber, or the like. The pads 60 are generally rectangular in cross-section and are movable laterally relative to the side plates 39.

More particularly, the pads 60 are suspended at the inner surfaces of each of the side plates 39 of the carriage 30 upon inwardly projecting guide studs 61 carried by the side plates. As best illustrated in FIGURE 7 of the drawings, the side plates 39 are formed of sheet metal or the like and are provided with upper and lower inturned flanges 62 (FIGURES 8 and 9) and with inwardly directed terminal vertical flanges 63 which are provided with inturned terminal portions 64 extending substantially vertically in substantial parallelism to the planes of the plates 39.

Extending between and joining the plates 39 at the front and rear ends thereof are the mounting studs 61 having enlarged heads abutting the terminal portions 64 and suitable abutments, such as washers 66 secured to the pin by suitable means, as by a cotter pin 67, abutting the exterior surface of the side plate 39. Mounted on each of the studs 61 for axial movement therealong is a bearing block 68 to which is secured a leaf spring 69 contacting vertically spaced portions of the inturned terminal portions 64 and serving to urge the bearing block 68 toward the side plate 39, i.e., to the right as illustrated in FIGURE 9.

Also carried by the bearing block is a sheet metal carrier plate indicated generally at 70 and comprising a peripheral planar portion 71 surrounding a dished central portion 72. Secured to the planar peripheral portion 71 of the plate 70 is an extensible diaphragm 73 formed of suitable material such as sheet rubber, and interposed between the plate 70 and the adjacent side plate 39. The extensible diaphragm 73 and the dished central portion 72 of the plate 70 cooperably define a plenum chamber 75 therebetween, this chamber communicating with the source of fluid under pressure, such as a source of air pressure, through a nipple 76 formed integrally with or rigidly secured to the central portion 72 of the plate 70 to receive the end 77 of the conduit 78 of rubber or similar flexible material communicating, as through line 79 (FIGURE 5) with a valve 80 mounted on the frame side-plate 32. This valve 80 thence the lines 79 and 78 to enter under pressure within supply line 43.

The inherently resilient pads 60 are secured to the plate 70 for movement therewith, as by hooks 81 carried by the planar portions 71 of the plate 70 and rubber bands or the like 82 secured to the hooks 81 and stretched over the pads 60. Upon the introduction of fluid under pressure into the plenum chamber 75, the flexible diaphragm 73 is distended as illustrated in FIGURE 3 to thrust against the carriage side-plates 39, thus displacing the rigid plate 70 to the left, and consequently displacing the pads 60 toward the longitudinal axis of the carriage and into engagement with the containers A interposed between the side plates.

Operation

The operation of the device of the present invention will be readily appreciated from a study of the drawings, wherein the sequence of operations involves the successive assumption by the apparatus of the positions illustrated sequentially in the FIGURES 4, 2, and 1.

More specifically, the empty take-out is positioned as illustrated in FIGURE 4 of the drawings, with the pads 60 laterally retracted, i.e., occupying their positions illustrated in FIGURES 7–9, inclusive. Next, fluid pressure is fed to the rear of the cylinders 35, as through line 47 and branch lines 49. The resulting forward displacement of the piston rods 46 are accommodated by the exhausting of air through the forward ends of the cylinders through lines 50 and 48 (FIGURE 3). Accordingly, the carriage comprising the front bracket 37, the rear bracket 35, and the side plates 39 therebetween (FIGURE 1) is displaced forwardly, such movement being guided by the rods 29 and the guides 36 carried by the rear bracket 35. The forward bracket is supported by the rollers 40 contacting the orifice block 11 on either side of the orifices 12.

During such forward movement, the cutting blade 38 will pass closely over the orifices and will sever the finished containers A from the plasticized material remaining below the level of the orifices 12 within the block 11. This forward movement will continue until the carriage side-plates 39 lie alongside of the containers A and the apparatus occupies its position illustrated in FIGURE 2.

At this time, fluid such as air, under pressure is introduced into the plenum chambers 75 through lines 78, distending the diaphragm 73 and displacing the plates 70 and the pads 60 carried thereby laterally toward the medial longitudinal plane of the carriage and into engagement with the containers A until the containers are gripped securely as best shown in FIGURES 1 and 3. At this time, the containers are gripped by the pads 60 and also by the neck molds 13. Upon release of the neck molds 13 and the upward retraction thereof, the containers are free for removal from their blowing position. Valve 44 is actuated at this time to interconnect line 47 and feed line 51, thereby exhausting air from the rear ends of the cylinders 45, and interconnecting lines 43 and line 48 to introduce fluid under pressure to the forward ends of the cylinders 45. The resulting operative displacement of the carriage continues until such time as the carriage occupies its position illustrated in FIGURES 1 and 5 with the containers A being removed from the forming machine by retraction of the inflated carriage.

Next, the plenum chambers 75 are exhausted, as through valve 80, and the leaf springs 69 urge the plates 70 towards their positions illustrated in FIGURES 8 and 9. As a result, the lateral outward displacement of the pads 60 releases the containers. Release of the containers will allow the containers to drop gravitationally between the carriage side plates 39 and the pads 60, thereby removing the containers downwardly for subsequent disposal.

I claim:

1. A take-out device for removing a formed article from a forming machine in which the article is retained by an integral portion, comprising a displaceable carriage having spaced side members, means for displacing said carriage to straddle the article between said members, severing means carried by and displaceable with the carriage to sever said article from said integral portion, and article contacting means carried by said carriage and movable into contact with said severed article after severance.

2. In a method of removing a plurality of articles alinged in a vertical plane from a forming machine in which the articles are blown from formed plastic material integral with unformed material, the steps of simultaneously longitudinally advancing a cutting edge intersecting said vertical plane to sever sequentially said articles from the unformed material and positioning spaced elongated resilient pads on either side of the vertical plane and out of contact with the aligned articles, urging both of said pads under fluid pressure toward said vertical plane into simultaneous engagement with all of said articles, maintaining said pads in engagement with said articles while longitudinally retracting said pads, and finally releasing said fluid pressure to relatively separate said retracted pads to release said articles from engagement.

3. A take-out device for removing a formed article from a forming machine, the articles being retained therein by a portion integral with the article, comprising a displaceable carriage having spaced side members, means for displacing said carriage in one longitudinal direction to interpose the article between said members, a cutting blade carried by said carriage at the leading edge thereof to sever said integral portion during displacement of said carriage, a fluid pressure-tight inflatable envelope on each side member, fluid pressure means for inflating said envelopes, article contacting means carried by said envelopes and movable transversely into gripping engagement with said article upon inflation of said envelopes, and means for displacing the severed and gripped articles and the carriage in the opposite longitudinal direction.

4. A take-out device for removing a plurality of aligned formed articles each retained in a forming machine by an integral waste portion, comprising a displaceable carriage, a cutting edge at the leading end of the carriage, means for displacing said carriage longitudinally in the direction of alignment of the articles to (1) sever the article waste portions and (2) straddle the articles, elongated article-contacting resilient pads on said carriage normally spaced apart a distance greater than the article dimensions and movable transversely into contact with the articles and inflatable means for moving said pads transversely to grip simultaneously all of the articles straddled by the carriage.

5. A take-out device for removing a plurality of aligned formed articles from a forming machine, the article being joined to unformed material in the machine by a waste portion, comprising a longitudinally displaceable carriage having spaced side and a leading cutting edge, means for displacing said carriage longitudinally in the direction of alignment of the articles to simultaneously sever the article waste portions and to interpose the article between said side members, articles-contacting resilient pads on each of said side members and individually movable transversely relative to the side members into contact with all of the articles, and means for moving said pads transversely to grip the article therebetween, said last named means including means defining an expansible fluid-tight chamber interposed between each of said pads and the adjacent one of said side members, and means for introducing fluid under pressure into each of said chambers.

6. In a method of removing a plurality of articles aligned in a vertical plane from a forming machine in which the finished articles are suspended in said vertical plane between mold-enclosed upper ends and lower waste portions joined to unformed material, the steps of simultaneously (1) longitudinally advancing a cutting edge intersecting said vertical plane to sever sequentially said articles from the unformed material and (2) positioning spaced elongated resilient pads on either side of the vertical plane and out of contact with the aligned articles, urging both of said pads under fluid pressure towards said vertical plane into simultaneous engagement with all of said articles, maintaining said pads in engagement with said articles while (1) opening the molds to release the upper ends of the articles and (2) longitudinally retracting said pads in engagement with said articles, and finally releasing said fluid pressure to relatively separate said retracted pads to release the articles.

References Cited in the file of this patent

UNITED STATES PATENTS

| | | |
|---|---|---|
| 2,609,113 | Huffman | Sept. 2, 1952 |
| 2,643,780 | Rowe | June 30, 1953 |
| 2,899,233 | Cella et al. | Aug. 11, 1959 |

FOREIGN PATENTS

| | | |
|---|---|---|
| 1,170,301 | France | Sept. 22, 1958 |